US007646313B2

(12) United States Patent
Winkler et al.

(10) Patent No.: US 7,646,313 B2

(45) **Date of Patent: *Jan. 12, 2010**

(54) METHOD AND DEVICE FOR ASSISTING IN THE PILOTING OF AN AIRCRAFT

(75) Inventors: Falk Winkler, Cintegabelle (FR); Guillaume Fouet, Toulouse (FR); Didier Menras, Toulouse (FR)

(73) Assignee: Airbus France, Toulouse (FR)

( * ) Notice: Subject to any disclaimer, the term of this patent is extended or adjusted under 35 U.S.C. 154(b) by 356 days.

This patent is subject to a terminal disclaimer.

(21) Appl. No.: 11/678,255

(22) Filed: Feb. 23, 2007

(65) Prior Publication Data

US 2007/0200731 A1 Aug. 30, 2007

(30) Foreign Application Priority Data

Feb. 28, 2006 (FR) .................................. 06 01715

(51) Int. Cl.
*G08G 5/04* (2006.01)

(52) U.S. Cl. ................... 340/961; 701/301; 342/357.14

(58) Field of Classification Search ................ 340/691; 701/301; 342/357.14
See application file for complete search history.

(56) References Cited

U.S. PATENT DOCUMENTS 4,835,537 A * 5/1989 Manion ....................... 342/30
5,227,786 A * 7/1993 Hancock ..................... 340/961
5,838,262 A * 11/1998 Kershner et al. ............ 340/945
5,872,526 A * 2/1999 Tognazzini ................. 340/961
6,085,150 A * 7/2000 Henry et al. ................ 701/301
6,154,151 A * 11/2000 McElreath et al. .......... 340/970
6,201,482 B1 * 3/2001 Schiefele et al. ............ 340/961
6,314,366 B1 * 11/2001 Farmakis et al. ............ 701/201
6,538,581 B2 * 3/2003 Cowie ........................ 340/961
6,564,149 B2 * 5/2003 Lai ........................... 701/301
6,683,541 B2 * 1/2004 Staggs et al. ................ 340/961
6,720,891 B2 * 4/2004 Chen et al. .................. 340/969
6,785,610 B2 * 8/2004 Baker et al. ................. 701/301
6,934,608 B2 * 8/2005 Qureshi ......................... 701/4
6,970,106 B2 * 11/2005 Vial ........................... 340/961
6,995,690 B1 * 2/2006 Chen et al. .................. 340/974
7,148,815 B2 * 12/2006 Derringer ................... 340/961
7,295,134 B2 * 11/2007 Jourdan et al. .............. 340/963
7,363,156 B2 * 4/2008 Winkler et al. .............. 701/301

(Continued)

FOREIGN PATENT DOCUMENTS

EP 1473546 * 11/2004

(Continued)

OTHER PUBLICATIONS

Brooker et al, "Reducing Mid-Air Collision Risk in Controlled Airspace: Lessons from Hazardous Incidents," Safety Science, Elsevier, vol. 43, No. 9, XP005152131, pp. 715-739, Nov. 2005.*

*Primary Examiner*—Daniel Wu
*Assistant Examiner*—Bradley E Thompson
(74) *Attorney, Agent, or Firm*—Dickinson Wright PLLC

(57) ABSTRACT

A device for assisting in the piloting of an aircraft includes a detecting device for detecting all the aircraft in the vicinity and a display device for presenting, on a display screen illustrating a vertical plane, characteristic symbols indicating the positions of these aircraft in the vicinity.

19 Claims, 3 Drawing Sheets

U.S. PATENT DOCUMENTS 7,382,285 B2 * 6/2008 Horvath et al. .............. 340/961
2006/0250280 A1 * 11/2006 Chen et al. .................. 340/974
2006/0265109 A1 * 11/2006 Canu-Chiesa et al.
2007/0200731 A1 * 8/2007 Winkler et al. .............. 340/961
2007/0222666 A1 * 9/2007 Coulmeau .................... 342/32

FOREIGN PATENT DOCUMENTS

JP 6179180 * 4/1986
WO 2004029902 * 4/2004

* cited by examiner

METHOD AND DEVICE FOR ASSISTING IN THE PILOTING OF AN AIRCRAFT

FIELD OF THE INVENTION

The present invention relates to a method and device for assisting in the piloting of an aircraft, in particular a military or civilian transport airplane.

BACKGROUND OF THE RELATED ART

Normally, the traffic surrounding an aircraft is represented onboard that aircraft on a display screen that, more often than not, indicates a position in plan mode, of the PPI (Plan Position Indicator) type, illustrating a graphical representation in the horizontal plane of the aeronautical surroundings of the aircraft. Such a display mode enables the pilot of the aircraft to easily identify the bearing and the distance of the aircraft in the vicinity displayed, but, however, not their vertical position. Also, to overcome this oversight, there are also normally displayed numerical values (relative or absolute) indicating the altitudes of the various aircraft in the vicinity. However, such a numerical representation of the altitude (or vertical position), associated with the abovementioned graphical representation (which is far more intuitive) of the horizontal position, makes understanding and perceiving the real position of the various aircraft in the vicinity difficult for the pilot. This display mode involves in particular a significant workload and a significant time to enable the pilot to mentally integrate the actual situation of the air environment of his aircraft.

SUMMARY OF THE INVENTION

The present invention relates to a method for assisting in the piloting of an aircraft, in particular a transport airplane, which can be used to remedy the abovementioned drawbacks.

To this end, said method whereby there is presented, on at least one display screen of said aircraft, a set of information that illustrates a vertical plane and that comprises:

- a system of axes, of which a Y axis is graduated altitude-wise, and an X axis is graduated distance-wise from the position of the aircraft; and
- a characteristic symbol representing the aircraft, which is positioned on said Y axis, in a position representative of the altitude of said aircraft, and is noteworthy in that, during a flight of the aircraft:

a) automatic surveillance of the surroundings of said aircraft is carried out, so as to be able to detect all aircraft in the vicinity that are located in a particular detection space situated at least in front of said aircraft; and b) for each of the aircraft in the vicinity detected in the step a), the following successive series of operations is performed automatically:

- b1) distance and altitude information concerning the aircraft in the vicinity is generated;
- b2) this distance and altitude information is used to determine a distance value and an altitude value; and
- b3) there is displayed, on said display screen, an auxiliary characteristic symbol that represents said aircraft in the vicinity and that is positioned on said system of axes in a position corresponding:
  - on said Y axis, to said altitude value; and
  - on said X axis, to said distance value.

Thus, with the invention, the pilot of the aircraft is supplied with a graphical representation that provides him with a readily understandable and legible display of the actual situation of his surroundings, in particular in the vertical plane, since each auxiliary characteristic symbol representing one of the aircraft in the vicinity detected is located on the Y axis (namely the vertical scale) at the corresponding altitude value (that is, at its actual altitude, absolute or relative, as specified below). This graphical representation of the vertical plane is far more intuitive for the pilot than a normal numerical representation of the altitude.

The method of assistance according to the invention also makes it possible to inform the pilot on the distance (distance value on the X axis) of the various aircraft in the vicinity.

Consequently, the method according to the invention enables the pilot to improve his perception of the actual situation of the surroundings of his aircraft, and makes it possible to reduce his workload, by significantly reducing the time it takes to understand the surrounding traffic.

Advantageously, in the step b1), distance and altitude information relating to at least one of said aircraft in the vicinity is generated:

- using a radar detection applied from said aircraft; or
- using the detection on the aircraft of a response from said aircraft in the vicinity to a prior interrogation sent from said aircraft; or
- using the reception on the aircraft of information that is transmitted by said aircraft in the vicinity.

Furthermore, advantageously, in the step b2), the distance between the actual position of the aircraft and an auxiliary position linked to said aircraft in the vicinity is determined as a distance value for at least one aircraft in the vicinity. In this case, said auxiliary position corresponds, advantageously;

- simply to the actual position of the aircraft in the vicinity; or
- to the orthogonal projection of that actual position of the aircraft in the vicinity on the axis of said aircraft; or
- to the orthogonal projection of said actual position of the aircraft in the vicinity on a segment of the flight path of the aircraft, and namely on that which is the nearest to this actual position.

Moreover, the method according to the present invention can present numerous other advantageous features. In particular:

- different distance values of aircraft in the vicinity can be highlighted, on the display screen, by different symbol systems; and/or
- the presentation characteristics of said set of information can depend on at least one particular parameter such as the flight phase of the aircraft for example; and/or
- said Y axis of said system of axes can have a variable scale; and/or
- at least one auxiliary characteristic symbol presented on said display screen can be interactive.

Furthermore, in a particular embodiment, the following operations are also carried out:

- for at least one aircraft in the vicinity detected in the step a), its flight path angle is determined; and
- in the step b3), there is also displayed, on the display screen, in association with the auxiliary characteristic symbol representing that aircraft in the vicinity, a straight-line segment illustrating its flight path angle.

The above operations can also be carried out for the aircraft on which the present invention is implemented.

Moreover, in a preferred embodiment, said display screen comprises at least two display windows, of which a first window comprises said set of information (abovementioned, illustrating the vertical plane) and a second window comprises a set of additional information, of the usual type, that illustrates a horizontal plane and that comprises:

a system of axes graduated distance-wise and bearing-wise;

a characteristic symbol illustrating the aircraft; and auxiliary characteristic symbols illustrating the aircraft in the vicinity that have been detected.

Thus, by associating with the graphical representation in the vertical plane according to the invention, a graphical representation in the horizontal plane of the usual type, the pilot can improve his perception of the actual situation of his environment, since the representation in the horizontal plane particularly provides additional information relating to the bearings of the aircraft in the vicinity.

The present invention also relates to a device for assisting in the piloting of an aircraft, in particular a transport airplane.

According to the invention, said device of the type comprising display means that can present, on at least one display screen of said aircraft, a set of information that illustrates a vertical plane and that comprises:

a system of axes, of which a Y axis is graduated altitude-wise, and an X axis is graduated distance-wise from the position of the aircraft; and a characteristic symbol representing the aircraft, which is positioned on said Y axis in a position representative of the altitude of said aircraft, is noteworthy in that:

said device also comprises:

first means for performing an automatic surveillance of the surroundings of said aircraft so as to be able to detect all aircraft in the vicinity that are located in a particular detection space situated at least in front of said aircraft;

second means for generating, for each of the aircraft in the vicinity detected by said first means, distance and altitude information; and third means for determining, for each of said aircraft in the vicinity detected, using said distance and altitude information, a distance value and an altitude value; and said display means are formed so as to present, on said display screen, for each of the aircraft in the vicinity detected by said first means, an auxiliary characteristic symbol that represents the aircraft in the vicinity concerned and that is positioned on said system of axes in a position corresponding:

on said Y axis, to the corresponding altitude value; and on said X axis, to the corresponding distance value.

BRIEF DESCRIPTION OF THE DRAWINGS

The figures of the appended drawing clearly show how the invention can be implemented. In these figures, identical references denote similar elements.

DETAILED DESCRIPTION OF THE INVENTION

Figure 1:
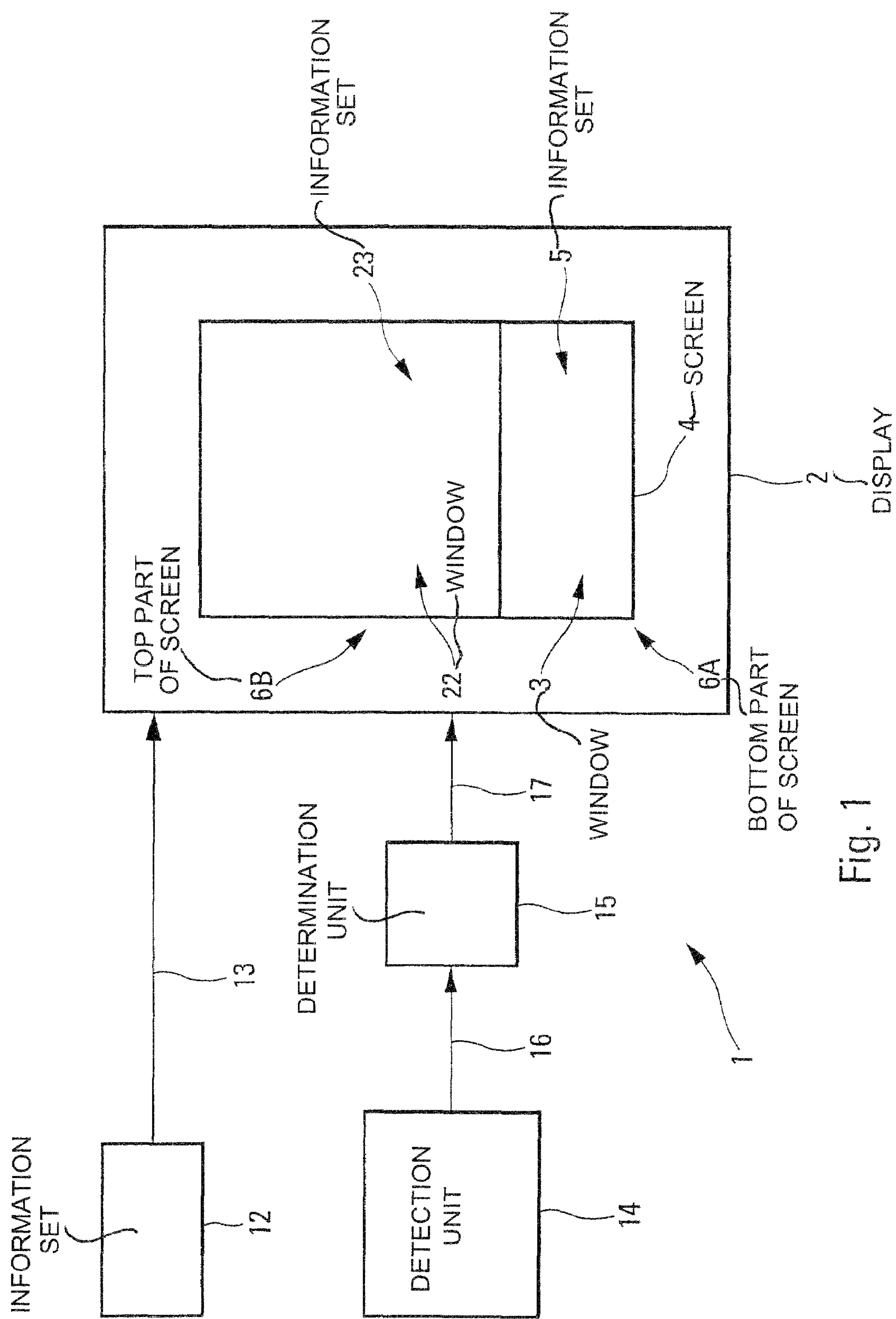
FIG. 1 is the block diagram of an assistance device according to the invention.

The device 1 according to the invention and represented schematically in FIG. 1, is intended to assist operators (pilot, copilot, etc.) of an aircraft, not shown, for example a military transport airplane, when piloting said aircraft.

To do this, said assistance device 1 which is onboard the aircraft, comprises display means 2 which can present, on a display window 3 of a standard display screen 4, a set of information 5 specified below. Said display window 3 can be represented on a part 6A of the display screen 4, for example a bottom part of the latter. It can also be represented over all of said display screen 4.

Figure 2:
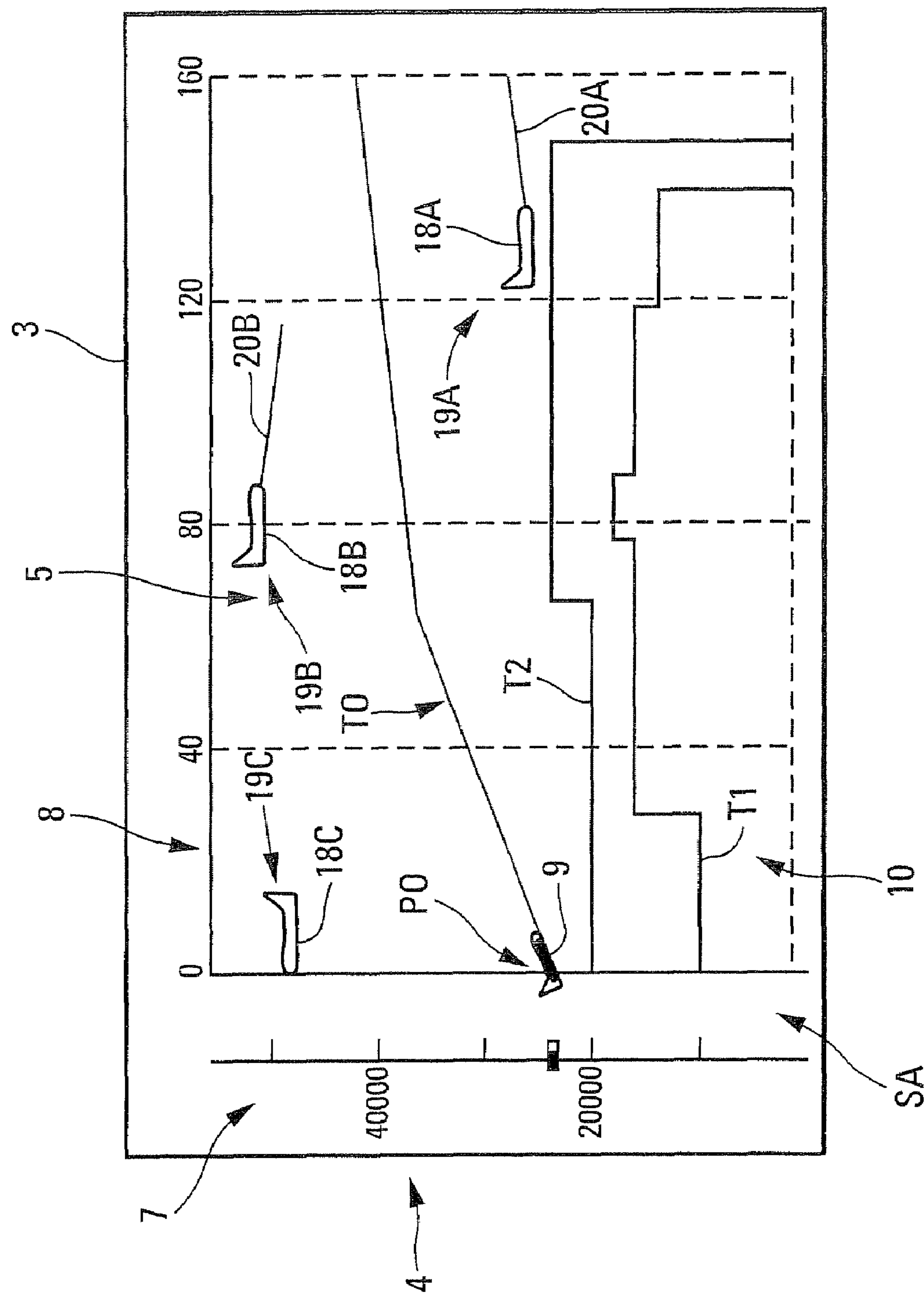
FIG. 2 shows schematically a display window of an assistance device according to the invention, clearly highlighting the main characteristics of the present invention.

Said set of information 5 illustrates a vertical plane and comprises, as represented in FIG. 2:

a system of axes SA, of which a Y axis 7 is graduated altitude-wise, preferably expressed in feet (one foot measuring approximately 0.3 meters), and an X axis 8 which is graduated distance-wise from the position of the aircraft illustrated by a characteristic symbol 9, said distance preferably being expressed in nautical miles NM (one nautical mile being approximately 1852 meters);

said characteristic symbol 9 which represents the aircraft and which is positioned on said Y axis 7 in a position PO representative of the altitude of said aircraft; and, where appropriate a standard plot T1, representing the profile of the terrain being flown over and showing a vertical section 10. This plot T1 can be formed according to the current route of the aircraft; and a standard plot T2, located above the plot T1 and representing a safe altitude.

Said device 1 can also comprise a set 12 of information sources, which is linked via a link 13 to said display means 2. Said set 12 of information sources can, in particular, comprise the following means not described in any more detail:

a central processing unit for acquiring and processing information, for example a flight management system FMS; and normal information sources such as navigation instruments and sensors giving information on the state and position of the aircraft, for example.

According to the invention, said device 1 further comprises:

means 14:

that make it possible to automatically monitor the surroundings of said aircraft so as to be able to detect all aircraft in the vicinity that are located in a particular detection space located at least in front of said aircraft; and that comprise incorporated means for generating, for each of the aircraft in the vicinity detected, distance and altitude information specified below; and means 15 that are linked via a link 16 to said means 14 and that are formed so as to determine, for each of the aircraft in the vicinity detected, using distance and altitude information received from said means 14, a distance value and an altitude value that are transmitted via a link 17 to said display means 2.

Furthermore, according to the invention, said display means 2 are formed to present, on said display window 3 of said display screen 4, auxiliary characteristic symbols 18A, 18B and 18C that respectively represent the different aircraft in the vicinity detected by the means 14. According to the invention, each of said auxiliary characteristic symbols 18A, 18B and 18C is positioned on said system of axes SA in a position 19A, 19B, 19C that corresponds:

on said Y axis 7, to the corresponding altitude value determined by the means 15; and on said X axis 8, to the corresponding distance value (specified below), also determined by said means 15.

Thus, the device 1 according to the invention supplies the pilot of the aircraft with a graphical representation that gives him a readily understandable and intuitive presentation of the actual situation of his surroundings, in particular in the vertical plane, since each auxiliary characteristic symbol 18A, 18B, 18C representing one of the aircraft in the vicinity detected is located on the Y axis 7 (namely the vertical scale) at the corresponding altitude value (that is, at its actual altitude, absolute or relative, as specified below).

Said device 1 also makes it possible to inform the pilot on the distance (distance value on the X axis 8) of the various aircraft in the vicinity.

Consequently, the device 1 according to the invention enables the pilot to improve his perception of the actual situation of the surroundings of his aircraft, and makes it possible to reduce his workload, by significantly reducing the time it takes to understand the surrounding traffic.

In the context of the present invention, said means 14 intended to generate distance and altitude information for the various aircraft in the vicinity can be implemented according to various embodiments, making it possible to obtain the geographic location of the various aircraft in the vicinity relative to the aircraft equipped with said device 1.

In a first embodiment, said means 14 perform a normal direct, non-cooperative, radar-type detection. The radar that is mounted on the aircraft equipped with the device 1 is able to know the elevation (bearing, distance, elevation) of the various aircraft in the vicinity so as to obtain a relative position for each of said aircraft in the vicinity relative to said aircraft. This embodiment is particularly appropriate in the case where not all the aircraft in the vicinity have a cooperative system as described below.

In a second embodiment, said means 14 perform a detection by response to interrogation, relating to a traffic collision avoidance system, TCAS. With such a cooperative system, the aircraft equipped with the device 1 interrogates the aircraft in the vicinity which return information enabling them to be located, in the form of absolute geographic positions.

Furthermore, in a third embodiment, said means 14 are formed so as to regularly receive from the aircraft in the vicinity position information making it possible to locate them. The means 14 take account, in this case, of an automatic transmission of surveillance parameters of the ADS-B (Automatic Dependent Surveillance-Broadcast) type. The duly obtained position is also an absolute geographic position.

As indicated previously, said means 14 perform a surveillance of the surroundings in a detection space. This detection space can correspond to any space around the aircraft, where said means 14 are technically able to perform a detection. It can also correspond (solely) to the space that can be displayed on the display screen 4.

From the abovementioned information generated by the means 14, the means 15 are able to determine the altitude values that correspond to the actual altitudes of the various aircraft in the vicinity. The actual altitude of an aircraft in the vicinity is deduced from the vertical position of that aircraft in the vicinity, which is known either in a relative manner (abovementioned first embodiment) or in an absolute manner (abovementioned second and third embodiments).

Furthermore, said means 15 determine, as a distance value for an aircraft in the vicinity, the distance between the actual position of the aircraft (equipped with the device 1) and an auxiliary position linked to that aircraft in the vicinity. In this case, said auxiliary position corresponds:

- simply and directly to the actual position of the aircraft in the vicinity. Thus, the distance between the characteristic symbol 9 and the corresponding auxiliary characteristic symbol directly illustrates the actual distance between the two aircraft, independent of their directions; or
- to the orthogonal projection of that actual position of the aircraft in the vicinity on the axis of said aircraft equipped with the device 1; or
- to the orthogonal projection of said actual position of the aircraft in the vicinity on a segment S1, S2, S3 of the flight path T0 of the aircraft equipped with the device 1, and more specifically on the segment that is closest to that actual position, as detailed further below with reference to FIG. 3.

It will be noted that, in the context of the present invention, different symbol systems can be used to show the distances of the aircraft in the vicinity relative to a planographic plane taken into account. It is possible in particular to use a set of different colors, different broken lines, and variable sizes.

Moreover, in the context of the present invention, said display means 2 can be formed so as to implement the following characteristics:

- the modes of presentation of said set of information 5 can depend on at least one particular parameter, for example the flight phase or an altitude stratum (offering a benefit);
- the display can also be filtered according to various parameters such as the flight phase, the position of the aircraft in the vicinity relative to the flight plane, etc;
- different or variable scales can be applied to the Y axis 7, in order to improve the accuracy of the information in a given altitude stratum. As an example, in cruising flight, only the levels close to the aircraft equipped with the device 1 can be of interest; and
- the various auxiliary characteristic symbols 18A, 18B and 18C can be interactive such that, on pointing and activating a cursor on one of said symbols 18A, 18B and 18C, the display means 2 display information concerning the corresponding aircraft in the vicinity, such as its speed, its altitude, its bearing or data enabling it to be identified.

Moreover, in one particular embodiment, said device 1 also comprises means, for example said means 14, making it possible to provide the flight path angle (FPA) of the aircraft in the vicinity, and of the aircraft on which the device 1 is mounted. This FPA value can be obtained, either by direct transmission (ADS-B), or by trigonometrical calculation on position and altitude variations at two successive instants. The display means 2 are formed so as to present on the window 3 of the display screen 4, in association with the auxiliary characteristic symbol representing an aircraft in the vicinity or the aircraft equipped with the device 1, a straight-line segment illustrating the corresponding flight path angle. FIG. 2 shows such straight-line segments 20A and 20B in association with the auxiliary characteristic symbols 18A and 18B.

Figure 3:
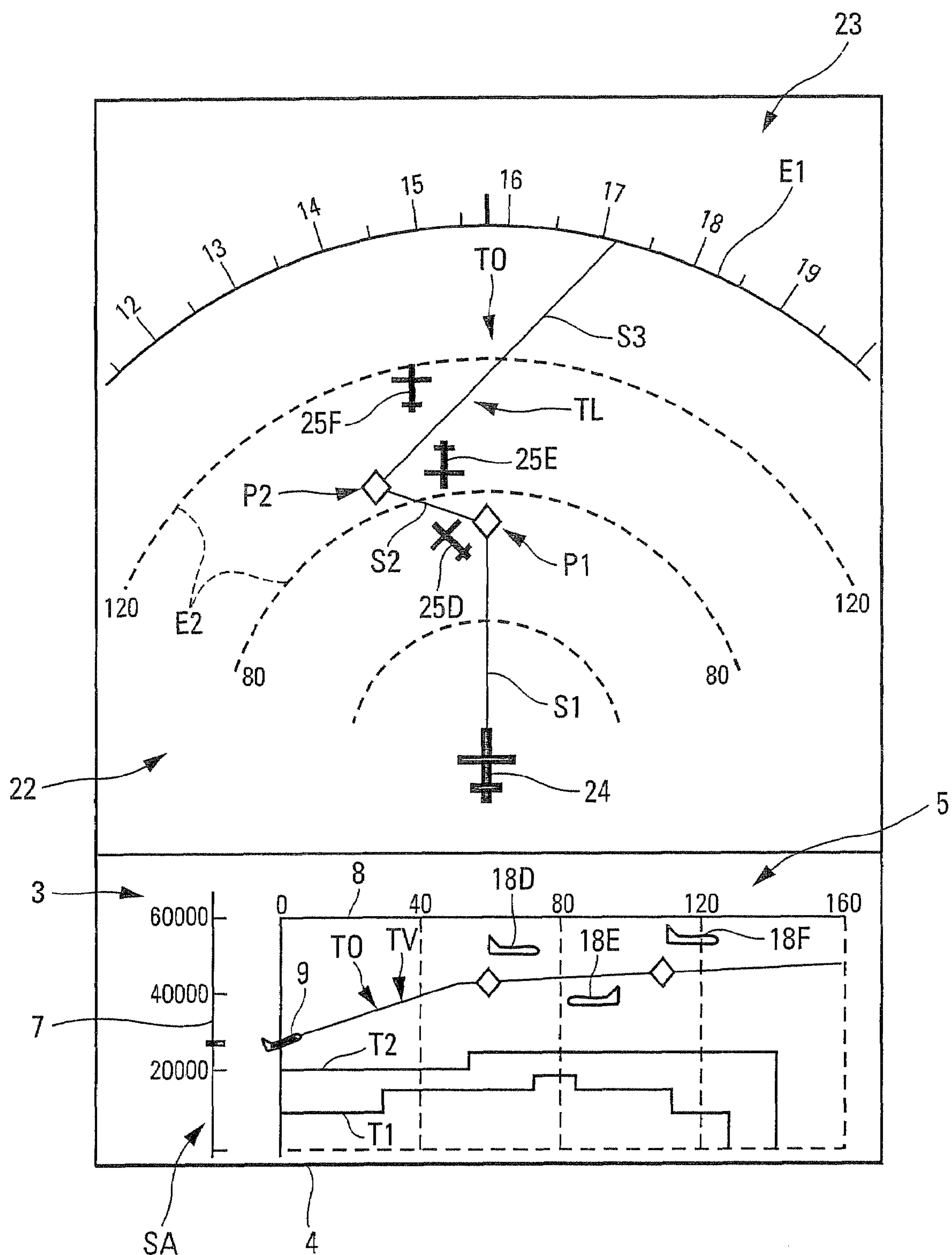
FIG. 3 illustrates schematically a particular display screen of an assistance device according to the invention.

Moreover, in a preferred embodiment, the screen 4 is a navigation screen, of the ND (Navigation Display) type, which comprises, in addition to the window 3 located in its bottom part 6A, a window 22 located in its top part 6B, as represented in FIG. 3. The window 22 comprises a set of information 23 that corresponds to a normal presentation on a navigation screen and illustrates the situation of the aircraft (lateral flight plane) in a horizontal plane. This set of information 23 comprises in particular, as represented in FIG. 3:

- a symbol 24 illustrating the position of the aircraft;

a plot TL representing the lateral flight path, that is, the flight path T0 of the aircraft in the horizontal plane. The corresponding vertical path TV is displayed in the window 3;

an angular separation graduation E1;

a distance graduation E2; and auxiliary characteristic symbols 25D, 25E and 25F located in the horizontal positions of aircraft in the vicinity that are shown, in the set of information 5 relative to the vertical plane, respectively by the symbols 18D, 18E and 18F.

In the horizontal plane, the flight path TL comprises a plurality of straight-line segments S1, S2, S3 that are joined at way points P1, P2. In the example of FIG. 3, the positions of the aircraft in the vicinity are orthogonally projected on the segment S1, S2, S3 of the flight path T0 which is closest to that actual position. Thus:

the aircraft in the vicinity illustrated by the symbols 18D and 25D is projected onto the segment S2;

the aircraft illustrated by the symbols 18E and 25E is projected onto the segment S2; and the aircraft illustrated by the symbols 18F and 25F is projected onto the segment S3.

Thus, by associating with the graphical representation in the vertical plane (set of information 5) according to the invention, a graphical representation in the horizontal plane (set of information 23) of the normal type, the device 1 makes it possible for the pilot to improve the perception of the actual situation of his surroundings, since the representation in the horizontal plane provides additional information, such as the bearings of the aircraft in the vicinity for example.

The invention claimed is:

1. A method for assisting in the piloting of an aircraft, whereby there is displayed, on at least one display screen of said aircraft, a set of information that illustrates a vertical plane, said set of information comprising a system of axes, of which a Y axis is graduated altitude-wise, and an X axis is graduated distance-wise from the position of the aircraft; a characteristic symbol representing the aircraft, which is positioned on said Y axis, in a position representative of the altitude of said aircraft, and where appropriate, an auxiliary characteristic symbol that represents an aircraft in the vicinity, method whereby distance and altitude information concerning an aircraft in the vicinity can be generated, said method comprising, during a flight of the aircraft:

a) performing automatic surveillance of the surroundings of said aircraft, so as to be able to detect all aircraft in the vicinity that are located in a particular detection space situated at least in front of said aircraft, and determining a flight path angle for at least one aircraft in the vicinity detected in this step a); and b) for each of the aircraft in the vicinity detected in the step a), performing the following successive series of operations:

b1) generating distance and altitude information concerning the aircraft in the vicinity;

b2) determining using said distance and altitude information a distance value and an altitude value; and b3) presenting on said display screen:

an auxiliary characteristic symbol that represents said aircraft in the vicinity and that is positioned on said system of axes in a position corresponding:

on said Y axis, to said altitude value; and on said X axis, to said distance value; and in association with the auxiliary characteristic symbol representing at least one of said aircraft in the vicinity, a straight line segment illustrating the flight path angle of this aircraft in the vicinity.

2. The method as claimed in claim 1, wherein step b1) comprises generating distance and altitude information concerning at least one of said aircraft in the vicinity using a radar detection applied from said aircraft.

3. The method as claimed in claim 1, wherein step b1) comprises generating distance and altitude information concerning at least one of said aircraft in the vicinity using the detection on the aircraft of a response from said aircraft in the vicinity to a prior interrogation sent from said aircraft.

4. The method as claimed in claim 1, wherein step b1) comprises generating distance and altitude information concerning at least one of said aircraft in the vicinity using the reception on the aircraft of information that is transmitted by said aircraft in the vicinity.

5. The method as claimed in claim 1, wherein step b2) comprises determining the distance between the actual position of the aircraft and an auxiliary position linked to said aircraft in the vicinity as a distance value for at least one aircraft in the vicinity.

6. The method as claimed in claim 5, wherein said auxiliary position corresponds to the actual position of the aircraft in the vicinity.

7. The method as claimed in claim 5, wherein said auxiliary position corresponds to the orthogonal projection of the actual position of the aircraft in the vicinity on the axis of said aircraft.

8. The method as claimed in claim 5, wherein said auxiliary position corresponds to the orthogonal projection of the actual position of the aircraft in the vicinity on the segment of the flight path of the aircraft, which is the nearest to this actual position.

9. The method as claimed in claim 1, wherein step b2) comprises determining the actual altitude of said aircraft in the vicinity as an altitude value.

10. The method as claimed in claim 1, wherein step b3) comprises highlighting different distance values of aircraft in the vicinity, on the display screen, by different symbol systems.

11. The method as claimed in claim 1, wherein, in the step b3), the presentation characteristics of said set of information depend on at least one particular parameter.

12. The method as claimed in claim 1, wherein said Y axis of said system of axes has a variable scale.

13. The method as claimed in claim 1, wherein at least one auxiliary characteristic symbol presented on said display screen is interactive.

14. The method as claimed in claim 1, wherein said display screen comprises at least two display windows, of which a first window comprises said set of information and a second window comprises a set of additional information that illustrates a horizontal plane and that comprises:

a system of axes graduated distance-wise and bearing-wise;

a characteristic symbol illustrating the aircraft; and auxiliary characteristic symbols illustrating the aircraft in the vicinity that have been detected.

15. A device for assisting in the piloting of an aircraft, comprising:

(a) a display device configured to present, on at least one display screen of said aircraft, a set of information that illustrates a vertical plane and that comprises:

a system of axes, of which a Y axis is graduated altitude-wise, and an X axis is graduated distance-wise from the position of the aircraft;

a characteristic symbol representing the aircraft, that is positioned on said Y axis in a position representative of the altitude of said aircraft; and where appropriate, an auxiliary characteristic symbol that represents an aircraft in the vicinity;

(b) a second means device configured to generate, for aircraft in the vicinity, distance and altitude information (c) a surveillance device configured to perform an automatic surveillance of the surroundings of said aircraft so as to be able to detect all aircraft in the vicinity that are located in a particular detection space situated at least in front of said aircraft;

(d) a third device configured to determine, for each of said aircraft in the vicinity detected, using distance and altitude information, a distance value and an altitude value; and wherein:

the surveillance device determines the flight path angle of at least one aircraft in the vicinity;

said second device is formed so as to generate distance and altitude information for each of the aircraft in the vicinity detected by said surveillance device; and said display device is formed to display, on said display screen:

for each of the aircraft in the vicinity detected by said surveillance device, an auxiliary characteristic symbol that represents the aircraft in the vicinity concerned and that is positioned on said system of axes in a position corresponding:

on said Y axis, to the corresponding altitude value; and on said X axis, to the corresponding distance value; and for at least one aircraft in the vicinity, in association with the auxiliary characteristic symbol representing this aircraft in the vicinity, a straight-line segment illustrating its flight path angle.

16. An aircraft, which comprises a device configured to implement the method specified under claim 1.

17. The aircraft, which comprises a device specified under claim 15.

18. The method as claimed in claim 1, wherein displayed on a first window of the at least one display screen is the set of information that illustrates the situation of the aircraft in a horizontal plane, and displayed on a second window of the at least one display screen is the set of information that illustrates the situation of the aircraft in the vertical plane.

19. The device as claimed in claim 15, wherein displayed on a first window of the at least one display screen is the set of information that illustrates the situation of the aircraft in a horizontal plane, and displayed on a second window of the at least one display screen is the set of information that illustrates the situation of the aircraft in the vertical plane.

* * * * *